(12) United States Patent
Wei et al.

(10) Patent No.: US 11,550,645 B2
(45) Date of Patent: *Jan. 10, 2023

(54) AUTO TERMINATION OF APPLICATIONS BASED ON APPLICATION AND USER ACTIVITY

(71) Applicant: Citrix Systems, Inc., Fort Lauderdale, FL (US)

(72) Inventors: Daowen Wei, Nanjing/Jiangsu (CN); Hengbo Wang, Nanjing/Jiangsu (CN); Jian Ding, Nanjing/Jiangsu (CN); Feng Tao, Nanjing/Jiangsu (CN); Manbinder Pal Singh, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,565

(22) Filed: Aug. 30, 2021

(65) Prior Publication Data
US 2022/0027219 A1    Jan. 27, 2022

Related U.S. Application Data

(63) Continuation of application No. 16/989,000, filed on Aug. 10, 2020, now Pat. No. 11,163,618, which is a (Continued)

(51) Int. Cl.
*G06F 9/54* (2006.01)
*G06F 16/16* (2019.01)

(52) U.S. Cl.
CPC .............. *G06F 9/544* (2013.01); *G06F 16/16* (2019.01)

(58) Field of Classification Search
None
See application file for complete search history.

(56) References Cited

U.S. PATENT DOCUMENTS

| | | | |
|---|---|---|---|
| 6,567,838 B1 | 5/2003 | Korenshtein | |
| 9,021,275 B1 | 4/2015 | Greenan et al. | |
| | (Continued) | | |

FOREIGN PATENT DOCUMENTS

| | | |
|---|---|---|
| CN | 102067088 A | 5/2011 |
| CN | 104657249 A | 5/2015 |
| CN | 110928600 A | 3/2020 |

OTHER PUBLICATIONS

Search Report and Written Opinion dated Apr. 22, 2021 for International Application No. PCT/CN2020/103994 filed Jul. 24, 2020; pp. 9.

*Primary Examiner* — Umut Onat

(57) ABSTRACT

A system and method that automatically terminates an application. A method includes monitoring activity data points for an application launched by a client device within a workspace environment. The activity data points may include user interactions with a physical interface component. State data for each file associated with the application is monitored and, if a determination is made that the application is inactive based on the activity data points, the method determines if a file associated with the application includes unsaved content based on state data. If it is determined that no files for the application include unsaved content, the method forecasts whether the application will be inactive for a future period based on the activity data. The application is terminated if it is determined that no files for the application include unsaved content and the application is forecast to be inactive.

19 Claims, 13 Drawing Sheets

Related U.S. Application Data continuation of application No. PCT/CN2020/103994, filed on Jul. 24, 2020.

(56) References Cited

U.S. PATENT DOCUMENTS

| | | |
|---|---|---|
| 9,032,536 B2 | 5/2015 | Keshet et al. |
| 9,141,172 B1 | 9/2015 | Leung et al. |
| 9,538,547 B2 | 1/2017 | Gupta et al. |
| 9,713,164 B2 | 7/2017 | Gupta et al. |
| 10,055,091 B2 | 8/2018 | Shaw et al. |
| 10,248,397 B2 | 4/2019 | Dain |
| 10,621,015 B2 | 4/2020 | Peterson et al. |
| 10,638,499 B2 | 4/2020 | Gerber et al. |
| 10,860,314 B2 | 8/2020 | Wright et al. |
| 11,163,618 B1 * | 11/2021 | Wei .................. G06F 9/544 |
| 2004/0243958 A1 * | 12/2004 | Bednar ................ G06F 30/30 |
| | | 716/113 |
| 2011/0113220 A1 | 5/2011 | Morishita |
| 2012/0174106 A1 | 7/2012 | Seo et al. |
| 2014/0223377 A1 | 8/2014 | Shaw et al. |
| 2018/0039779 A1 | 2/2018 | Li et al. |
| 2020/0326766 A1 | 10/2020 | Tsirkin |
| 2021/0191902 A1 | 6/2021 | Vaykole et al. |

* cited by examiner

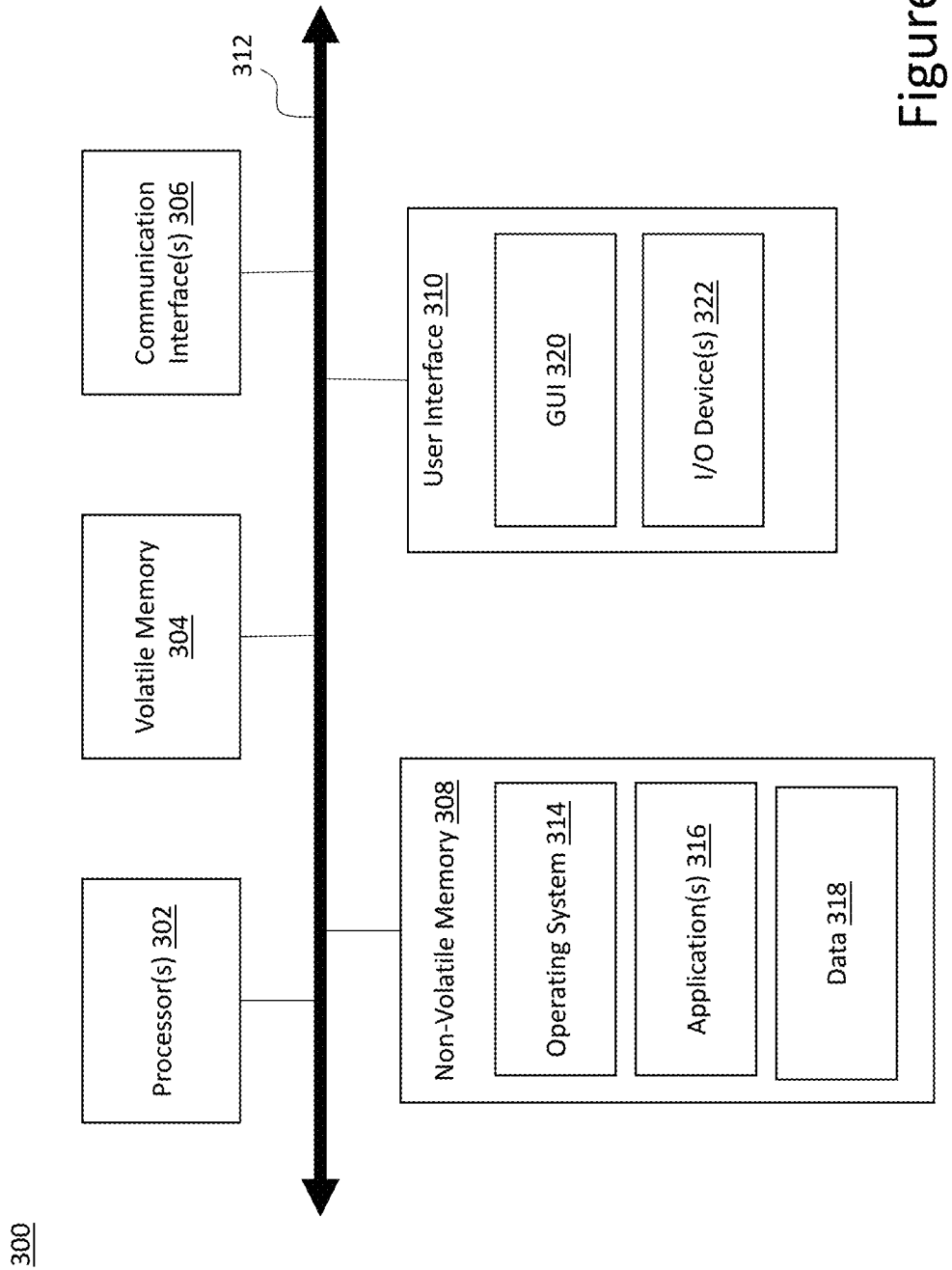

AUTO TERMINATION OF APPLICATIONS BASED ON APPLICATION AND USER ACTIVITY

BACKGROUND OF THE DISCLOSURE

Users of enterprise computing resources often run multiple applications concurrently. For example, at any given time, a user may be running an email application, a word processing application, a customer relationship management (CRM) application, a database application, etc. Some of the applications being run by a given user may be accessed frequently, while others are only accessed infrequently. Often, those applications not being accessed at a given time by the user simply run with the application window in the background or a minimized state. Nonetheless, all applications, whether being accessed or not, consume enterprise resources.

BRIEF DESCRIPTION OF THE DISCLOSURE

Aspects of this disclosure provide a system and method that automatically terminates applications that are currently inactive, predicted to be inactive, and that are not associated with unsaved data.

A first aspect of the disclosure provides a method that terminates applications. The method includes monitoring activity data points for an application launched by a client device, wherein the activity data points include user interactions with a physical interface component, and monitoring state data for each file associated with the application. The method further includes, in response to a determination that the application is inactive during a current time period based on the activity data points, determining if at least one file associated with the application includes unsaved content based on the state data. In response to determining that no files for the application include unsaved content, forecasting whether the application will be inactive for a future time period based on the activity data. Then, in response to determining that no files for the application include unsaved content and the application is forecast to be inactive for the future time period, terminating the application.

A second aspect of the disclosure provides a system including a computing system configured to monitor activity data points for an application launched by a client device, wherein the activity data points include user interactions with a physical interface component, and to monitor state data for each file associated with the application. In response to a determination that the application is inactive during a current time period based on the activity data points, the system determines if at least one file associated with the application includes unsaved content based on the state data. In response to determining that no files for the application include unsaved content, the system forecasts whether the application will be inactive during a future time period based on the activity data. In response to determining that no files for the application include unsaved content and the application is forecast to be inactive for the future time period, the system terminates the application.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 4 depicts a table showing application activity, in accordance with an illustrative embodiment.

FIG. 11 depicts active/inactive patterns for an application, in accordance with an illustrative embodiment.

FIG. 15 depicts a computing system, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for terminating inactive applications within a computational workspace environment. In such an environment, users utilize endpoint computing devices to access virtual resources, such as virtual applications, virtual desktops, and virtual servers that are hosted by computing devices physically distinct from the endpoint devices (e.g., as provided by Citrix® Workspace or the Citrix® Receiver, both of which are commercially available from CITRIX SYSTEMS of Fort Lauderdale, Fla. in the United States).

In many cases, users typically run multiple applications (also referred to as "apps") in which a few are frequently accessed (referred to herein as "active apps" or "active applications"), while the majority are only accessed occasionally (referred to herein as "inactive apps" or "inactive applications") often just running in the background with no user interaction whatsoever. Inactive applications may run in their own session (with no other applications), in a shared session (with multiple applications from the user sharing the same windows session), or a desktop session.

As noted, inactive applications consume resources such as CPU, Memory, I/O, etc., which can impact performance of the system. For example, inactive applications can prevent a new session from launching on the same server and/or cause a poor or degraded experience for other users sharing the same server. Furthermore, inactive applications can interfere with activities of information technology (IT) administrators, who are required to do routine maintenance tasks including bringing down servers and sessions to install upgrades and patches. In addition to the ineffective resource utilization, inactive applications also increase cost for the service providers/customers, especially in cloud scenarios where each running server attributes to more compute/storage cost.

Although IT administrators could monitor application usage and suggest end users close inactive or unnecessary applications, there is no guarantee that a user will close the application. In most cases, IT administrators cannot simply close user applications since they have no idea whether it is safe to do it without any data loss. To overcome these challenges, solutions are provided that utilize forecasting techniques to identify inactive applications and terminate such applications if no data loss can be guaranteed.

Figure 1:
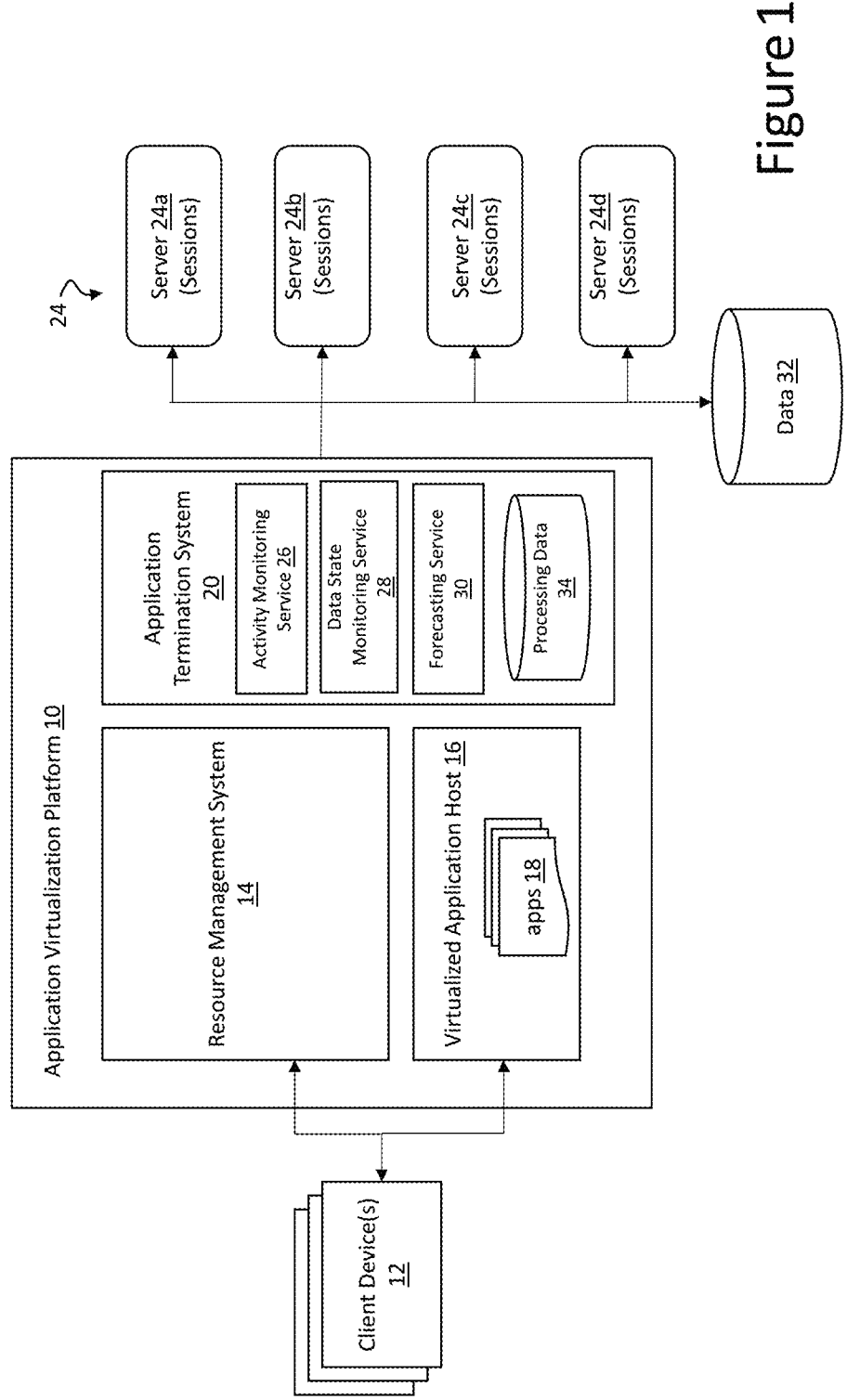
FIG. 1 depicts an illustrative workspace platform, in accordance with an illustrative embodiment.

FIG. 1 depicts an illustrative workspace environment that includes a set of client devices 12 that generally include endpoint computing devices, e.g., desktops, laptops, smart devices, etc., that run virtualization client applications hosted by an application virtualization platform 10. As noted, users access the platform 10 via the client devices 12 that are configured to provide users with access to virtual resources, such as virtual applications, virtual desktops, and virtual servers that are hosted by computing devices physically distinct from the endpoint devices.

In the illustrative embodiment shown in FIG. 1, a virtualized application host 16 provides a set of applications (apps) 18 accessible via client devices 12. When a user submits a request to launch an application 18, resource management system 14 implements the process of delivering the application to the client device 12, including, e.g., authenticating the user, determining a hosting option 24 to host the application (e.g., selecting server 24a, 24b, 24c, or 24d), running the application, etc. In addition, access to data 32 (i.e., files) is provided, e.g., via a file server (not shown), which may include documents, images, spreadsheets, data structures, tables, data objects, etc., utilized by (i.e., associated with) an application 18.

In this illustrative embodiment, platform 10 also includes an application termination system 20 that is configured to automatically terminate a selected application 18 upon certain conditions. In this case, application termination system 20 includes: an activity monitoring service 26 that determines whether the selected application 18 is active or inactive during a current time period (e.g., the last 15 minutes); a data state monitoring service 28 that determines whether there is potentially unsaved data associated with the selected application; and a forecasting service 30 that determines a probability that the selected application will be inactive during a future time period (e.g., the next hour). Processing data 34, which may include historical data, training data, collected metrics, indicators, models, analysis, etc., is captured and saved to facilitate forecasting and other processes implemented by the application termination system 20, as described herein. In one scenario, if the selected application is currently inactive, forecast to be inactive in the future time period, and does not have any associated unsaved data, the selected application can be terminated by the application termination system 20.

Figure 2:
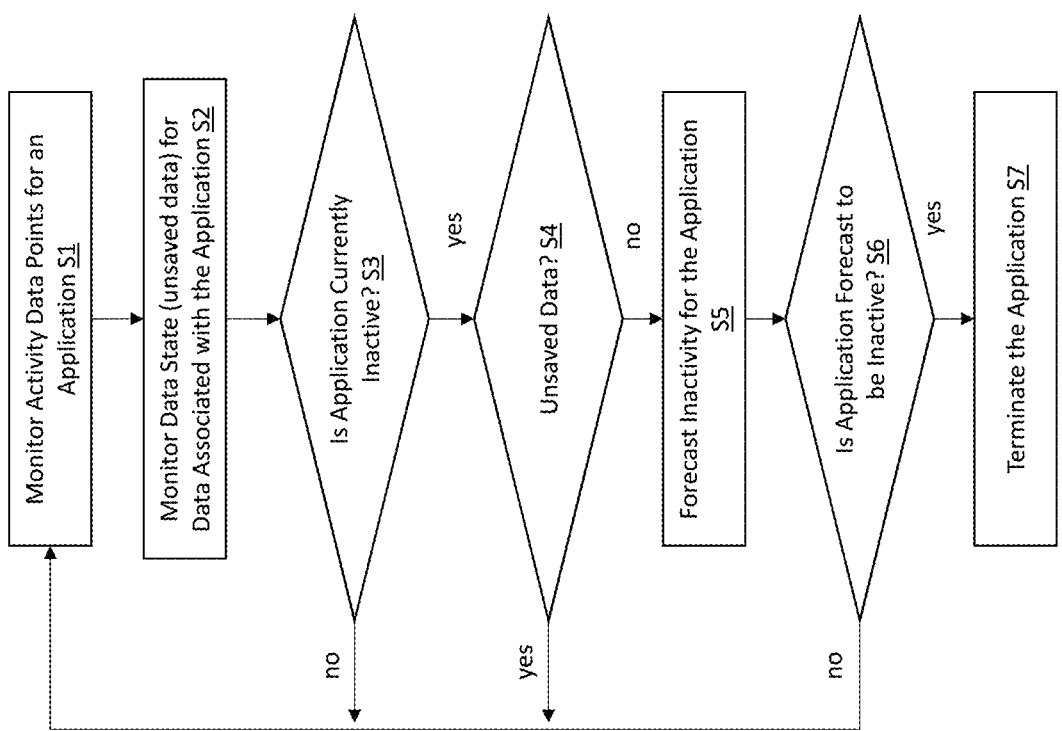
FIG. 2 depicts a flow diagram of a process for terminating applications, in accordance with an illustrative embodiment.

FIG. 2 depicts a flow diagram of an illustrative method of implementing application termination system 20 of FIG. 1. Initially, activity data points for an application 18 are monitored by the activity monitoring service 26 at S1 to determine whether the application 18 is currently active or inactive. In one illustrative approach, activity data points include (1) user interactions with physical components such as keyboard inputs, mouse inputs, touchscreen inputs, voice inputs, gesture detectors, image capture system, etc., and (2) background activities involving the application that are not directly caused by the user, such as network interactions, file input/output (I/O) interactions, device access, registry access, etc. These activities (also referred to herein as "interactions) are monitored by activity monitoring service 26 using various application programming interfaces (API's), hooks and other mechanisms. For example, physical mouse interactions can be monitored by using common hooks/event listeners for mouse events such as WM_SETCURSOR, WM_MOUSEMOVE, WM_LBUTTONDOWN, and WM_MOUSEACTIVE and/or clicked, pressed events on various user interface (UI) elements within the application 18. Keyboard interactions can be monitored using keystroke common event handlers at the application level or system level, e.g., KeyPressed, KeyUp, KepDown events can be used detect activity. Touch events can be detected with hooks, e.g., using operating system (OS) Touch Event handlers or API's.

Background activities can likewise be detected in any manner. For example, activity monitoring service 26 can register to an Event Tracing for Windows (ETW) framework as an event tracing consumer and keep listening kernel events generated to collect various data points related to disk operations, file I/O, network activity, etc., e.g., using common commands such as DiskIo_TypeGroup*, FileIo_ReadWrite, TcpIp*/UdpIp*, etc. Additionally, various callback routines, e.g., such as those provided by Windows Driver Kit can be used to monitor process creation/deletion, registry access behavior, etc. Further, mini-filter drivers can be used to monitor file system access.

At S2, the data state for data 32 associated with the application 18 is also monitored by data state monitoring service 28 to track whether unsaved data exists for an application running on a client device 12. In one approach, data state monitoring service 28 detects whether the user opened and/or saved a file within the application 18. For example, a file may be considered saved when a user clicks, taps or touches a save command, performs a save keyboard shortcut, interacts with a file dialog, etc. Various types of UI controls can be utilized, such as UI automation, to monitor UI elements/controls with names such as "Save," "Save as," "Open," etc., and detect when a file dialog is launched or closed. In an alternative approach, machine learning image processing models can be utilized to identify and monitor UI elements, icons, etc., displayed on a client device 12, which are known to perform file manipulation operations. Alternatively, hooks can be implemented and enabled to perform detection, such as hooking input events from a keyboard. UI automation event handlers/hooks can be used that get invoked when the control key is clicked. API's such as GetOpenFileName, GetSaveFileName, WM_NOTIFY messages can be hooked to process OFNOTIFY/OFNOTIFYEX, and an OFNHookProcOldStyle hook procedure can detect and process the received messages or notifications for a dialog box procedure. Within a file dialog, open/save button handlers can be hooked using UI automation as well. File drag and drop events can also be used to detect a file dropped on an application window to be opened. Similarly, auto-save operations can also be detected, e.g., based on application or operating system settings.

At S3, a determination is made whether the application is currently inactive (based on the activity data points monitored at S1). If no, then the monitoring process continues at S1 and S2. If yes at S3, then a determination is made whether there is unsaved data (based on the data state determined at S2). If there is unsaved data (e.g., a file was opened by not saved), then the monitoring process continues at S1 and S2. If no at S4, then inactivity for the application is forecasted at S5 by forecasting service 30. Forecasting may for example be based on user and application activity, including historical data. Statistical and machine learning models may be implemented for classification and prediction. Illustrative techniques are described elsewhere herein.

At S6, a determination is made whether the application is forecast to be inactive during a future period. If no, then the monitoring process continues at S1 and S2. If yes at S6, then the application is automatically terminated at S7.

Figure 3:
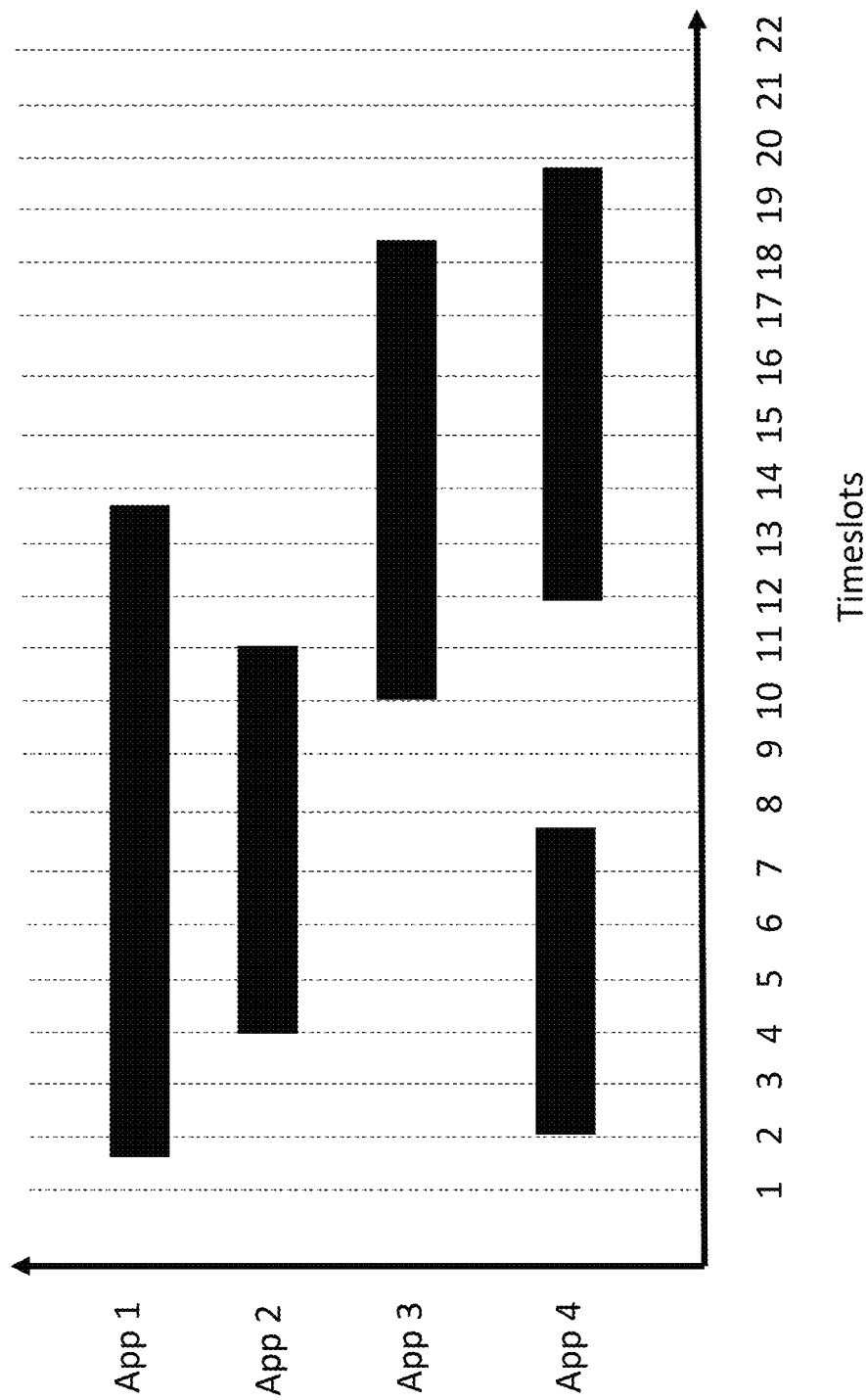
FIG. 3 depicts a graph showing application usage, in accordance with an illustrative embodiment.

Activity monitoring service 26 may, at any point in time, be monitoring multiple applications 18 within a session. An example of this is shown in FIG. 3 in which activity data is collected during 15 minute timeslots for four applications (App 1 . . . App 4). In one approach, each timeslot is a sequence number of the sampling interval starting, e.g., from 12:00 AM. Thus, e.g., timeslot 36 refers to the time interval of 8:45 AM-9:00 AM. It is understood that although 15 minutes is utilized in this example, the timeslot size is not limit to a particular size. In an illustrative approach, activity monitor service 26 keeps the same sampling timeslot size for all applications 18. However, in an alternative approach, timeslots can be configured differently on per application or per user basis.

Activity monitor service 26 counts and stores both user interactions and background interactions for each timeslot. If an application is not running, then for a given timeslot nothing will be recorded for that application. In one example, metrics are collected for each application, such as the following:

| Metrics | Additional Explanation |
|---|---|
| App name | The unique application name |
| Date | The sampling date and time |
| Timeslot | The sequence number of the sampling interval |
| Mouse | The mouse event counter |
| Keyboard | The keyboard event counter |
| Touch Pad | The touch pad event counter |
| Touch Screen | The touch screen event counter |
| File I/O | The I/O number to access file system |
| Network Communication | The data size of sending/receiving packets over network. |
| Registry | The data size of read/write bytes to registry |
| Peripheral Device | The data size exchanged between OS and peripheral device |

Figure 4:
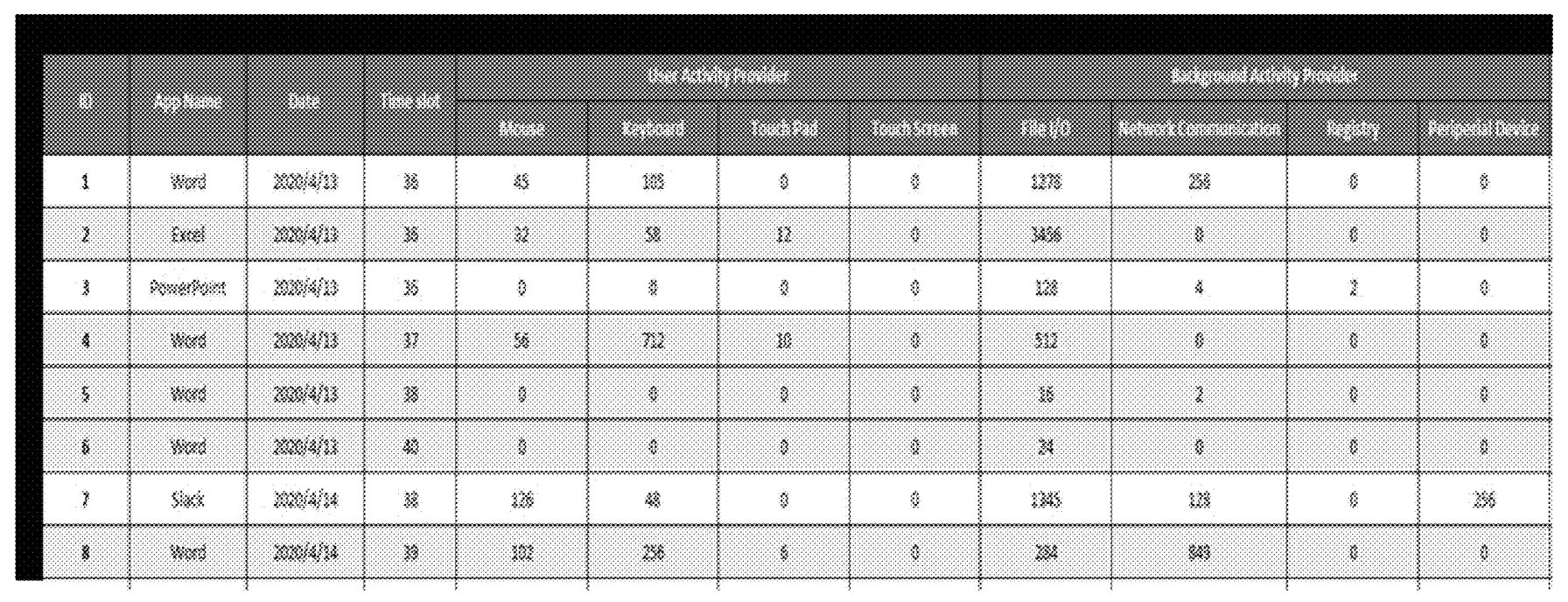

FIG. 4 depicts a table showing metrics being recorded at different timeslots for different applications for a user. For example, in timeslot 36 it can be seen that activity was detected for Word, Excel and PowerPoint applications. Based on the collected metrics, an activity status indicator can be generated that indicates whether the application was active or inactive for a given period.

Figure 5:
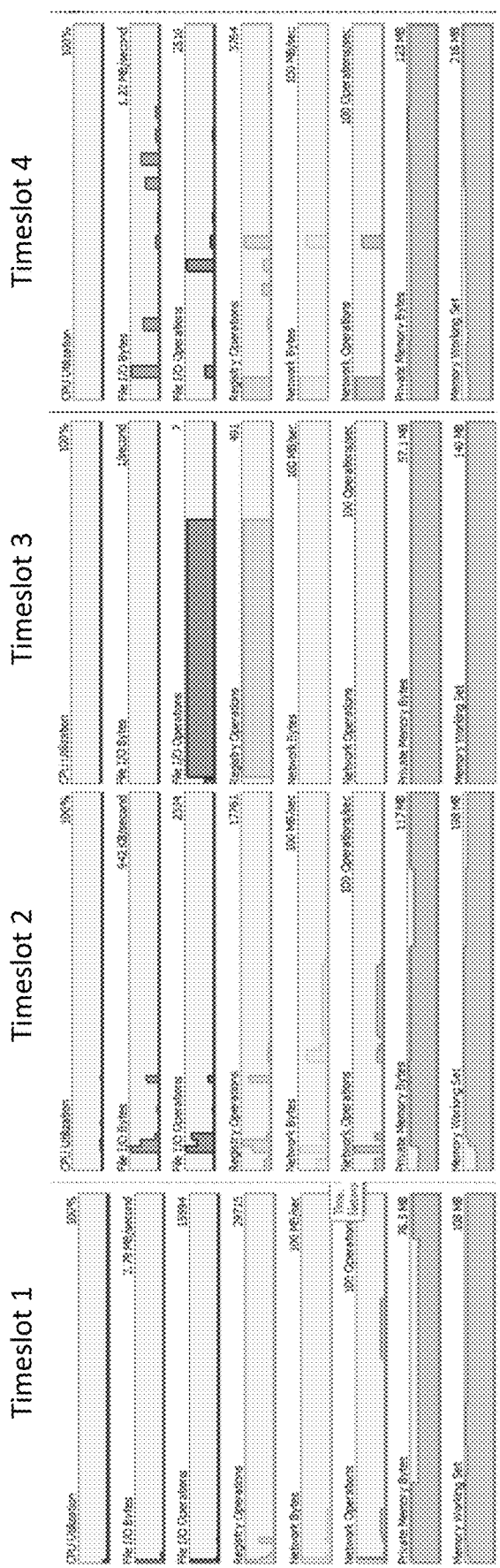
FIG. 5 depicts application background activities over a set of timeslots, in accordance with an illustrative embodiment.

In one illustrative approach, if user interactions (i.e., activity) are detected, then the application will be indicated as active during the timeslot. However, in certain cases, background interactions may be detected for an application, but the application may still be characterized as inactive. In one approach, determining when to characterize an application as active or inactive may be accomplished with a machine learning (ML) model. For example, FIG. 5 depicts captured sample background interaction data at four different timeslots for an application that can be used to train an ML model. Each timeslot is associated with a particular type of recorded usage, e.g., in Timeslot 1, an application was launched and no document was opened; in Timeslot 2, a document was opened and left open for five minutes; in Timeslot 3, the application was left idle with no user interaction; and in Timeslot 4, the application was used to edit a document and then left alone. During each sample, the different CPU, File I/O, etc., behaviors can be captured and associated with the given type of usage.

Once this information is collected, various methods can be used for training and classifying sample data from the metrics into an active or inactive status. In one approach, various metrics as shown in FIG. 5, as well as data from the table in FIG. 4 can be combined with a User Identifier, User Session, Application Id/Name, User Interaction Detected, Timeslot Sequence Number, Start Time, End Time, etc. This data can be collected from various users and applications and done for a duration that can be based on a number of days or a number of samples. This data then undergoes data preparation and a pipelining process where the data is converted into an input vector and normalized. Using a ML model pipeline, models are used in various batch and epochs where hyper tuning is used to find the best performing model(s).

In one ML approach, classification is based on whether there was any user interaction. If for a sample, there was no user interaction recorded from keyboard/mouse/touch then that sample is tagged as inactive. Samples where there was a user interaction are tagged active. This helps in the various ML models. While supervised learning algorithms with human intervention are also possible based on the similar input metrics, this would require an admin/user to do an operation or not to do an operation, and then tag those as active or inactive respectively.

A K-Nearest neighbor classification algorithm can be used to separate out inactive samples from active samples. This can be seen in the FIG. 5 idle scenarios in which file I/O, registry and memory drop, which can help classify into active and inactive sets. DB-SCAN could also be used as an alternative clustering unsupervised algorithm.

Statistical analysis could also be utilized to categorize activity. For each time slot where metrics are recorded for an application, an application activity status indicator is determined. Application activity status is a union status of all sub-activities status from various application monitoring categories as follows:

$$Status_{ij} = \bigcup_{k=1}^{N} \text{Assert}(Value_{ijk} > Threshold_{ik})$$

Where:
1) $Status_{ij}$ is the status of the $i^{th}$ application in the $j^{th}$ timeslot.
2) $Value_{ijk}$ depicts the activity index from the $k^{th}$ provider of the $i^{th}$ application in the $j^{th}$ timeslot.
3) $Value_{ik}$ is the active threshold for the $k^{th}$ provider of the $i^{th}$ application.

Thresholds can then be used as follows:
   User Interaction based activity monitoring metrics may use zero as the threshold value as any user interaction will result in a count>0.
   However, a non-zero threshold should be applied to the application background activities because the application could produce trivial but necessary events not driven by user interactions. The background activities vary for different applications and is different for each of the monitoring categories.

Thresholds are saved in a backend server/services and are associated with an application.

When an application is launched, these thresholds are sent from the application termination system 20 (FIG. 1) to the session so as to help in evaluating the application activity status indicators.

Thresholds can be determined using a discovery phase (such as N launches of an application, or N days of monitoring for an application, etc.), or can also be configured by an admin on a global or per app basis.

Various methods can be used to determine threshold values for a background activity.

Figure 6:
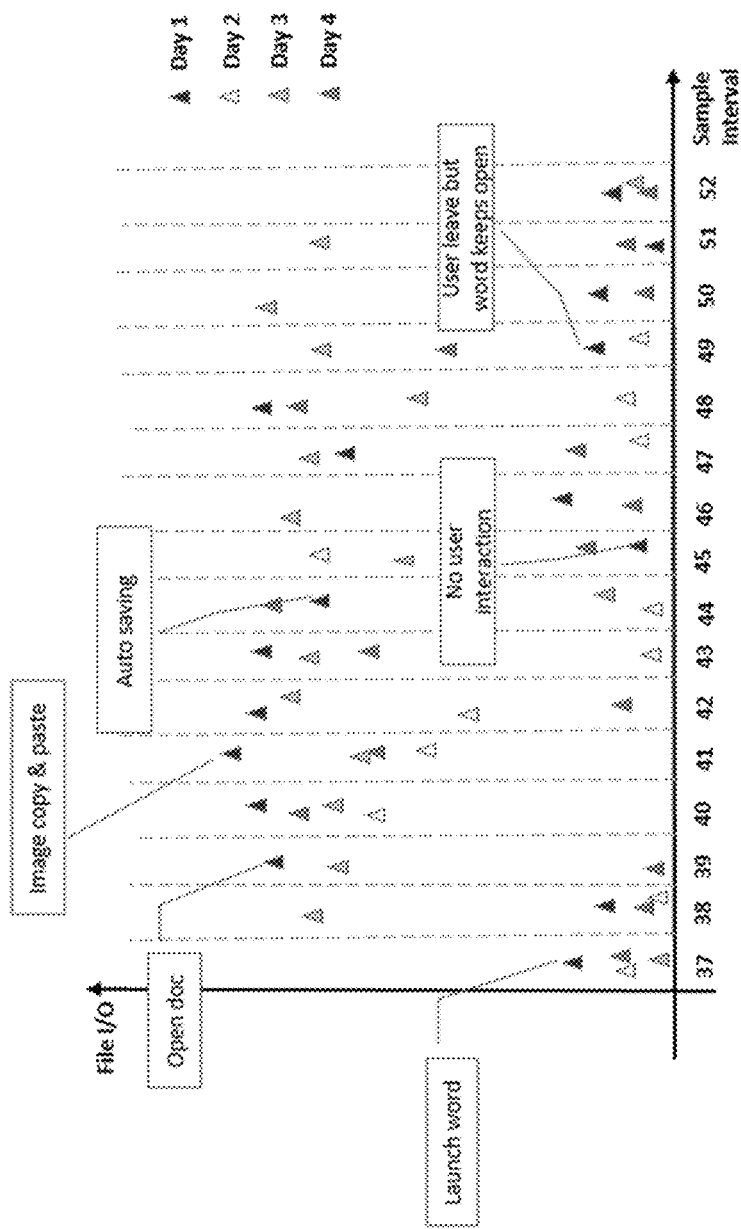
FIG. 6 depicts a file I/O activities over a set of timeslots, in accordance with an illustrative embodiment.

In a discovery phase, the activity monitor service 26 regularly samples user activities and application activities in a fixed timeslot to forecast application status and build threshold values of background activities. For example, a sample file I/O of Word application usage is shown in FIG. 6 to demonstrate such a process of collecting training samples. In this example, a user launches Word application at timeslot #37, but leaves it alone at timeslot #38 in day 1 with a low file I/O load. Frequent user interactions do not happen until timeslot #39. From then on, user interactions such as browse, text typing, image copy/paste, together with auto save, happen to contribute to a higher file I/O. The user then leaves Word application, but keeps it open in the background after timeslot #49. This process records all file I/O metrics in timeslots when the application is on. It repeats the same steps to collect training samples in the discovery phase. For instance, the first four days may implement the discovery phase.

Figure 8:
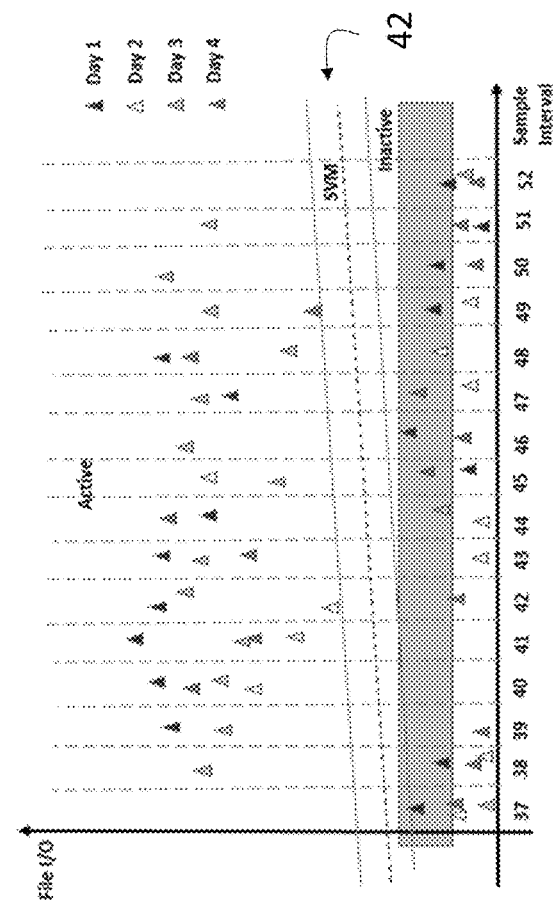
FIG. 8 depicts further threshold calculations for the file I/O activities of FIG. 6, in accordance with an illustrative embodiment.
Figure 7:
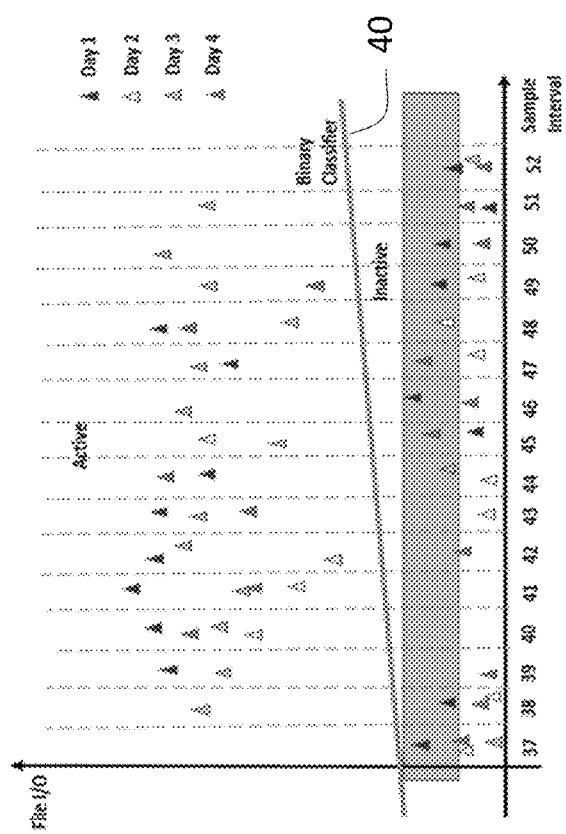
FIG. 7 depicts a threshold calculation for the file I/O activities of FIG. 6, in accordance with an illustrative embodiment.

Once all training samples are available in the discovery phase, a variety of classification algorithms can be applied to tag active and inactive samples. Classification can be based on whether there was any user interaction, i.e., if for a sample, there was no user interaction recorded from keyboard/mouse/touch then that sample is tagged as inactive. Samples where there was a user interaction are tagged active. After classification is done, thresholds for various background activities can be identified as active as well as inactive. Various methods can be used to determine thresholds. For example, FIGS. 7 and 8 depicts samples out of an inactive sample pool marked by the shaded rectangle. Thresholds can be calculated using various methods, and are shown as the sloped lines 40, 42, e.g., using binary classifiers, mean or median values, SVM, etc.

Figure 10:
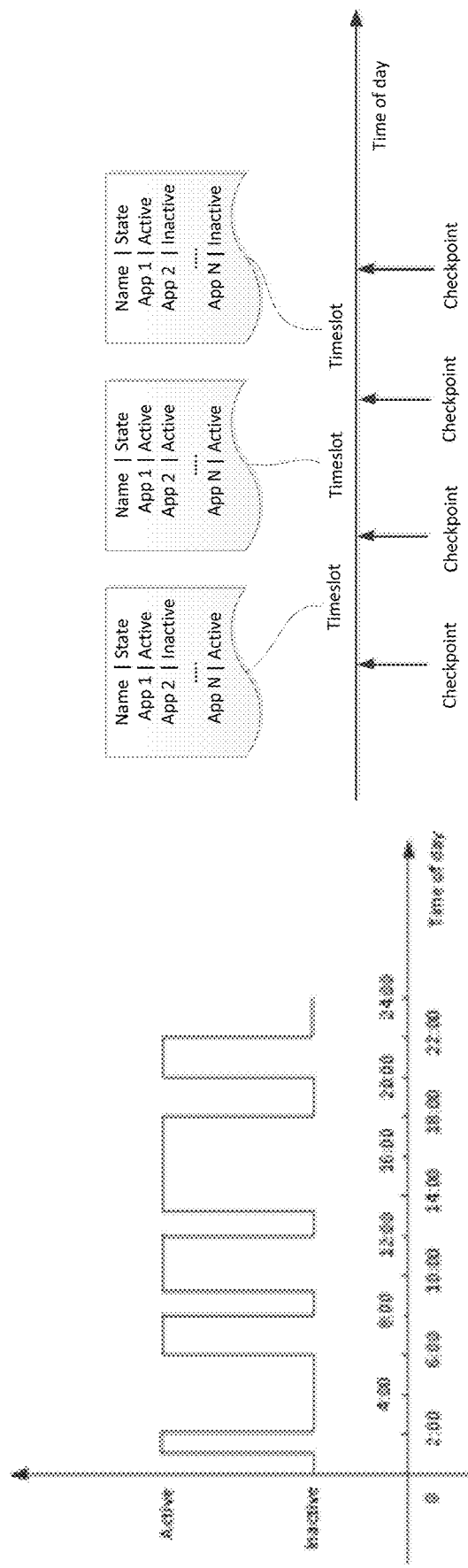
FIG. 10 depicts active/inactive states for a set of applications, in accordance with an illustrative embodiment.
Figure 9:
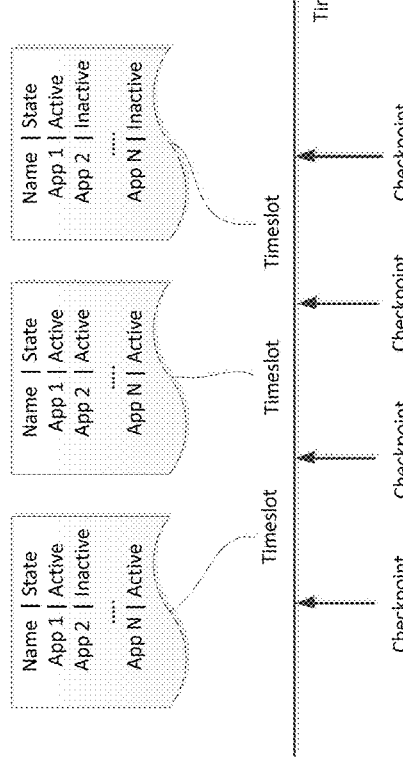
FIG. 9 depicts a graph showing active/inactive results as a function of time, in accordance with an illustrative embodiment.

A k-NN regression model can also be used to produce an output whose value is the average of the values of k nearest neighbors. FIGS. 9 and 10 shows example of how an application activity status indicator for an individual app (FIG. 9) and multiple of apps (FIG. 10) varies over the day and timeslots respectively.

As noted, a document state monitoring service 28 (FIG. 1) monitors whether data associated with an application is unsaved or saved. In this example, a document state is monitored, i.e., whether a document has been opened/saved or not, and records a document save state indicator "DocumentState" based on any event changes resulting from user interactions. A finite state machine can be used to track various information such as: when the application is initially launched with no document opened, DocumentState=NoDocument; when a document is opened either using file open dialog or drag and drop, our event handlers are invoked to detect file opened, DocumentState=DocumentOpened (as this is the first time document is opened, it indicates a saved document); when a user interacts within the application and window such as pressing keystrokes to edit/change/write, changing UI, our event handlers are invoked and now, DocumentState=DocumentNotSaved; when a user does save the document by either using a file save dialog/icons/menu items etc., event handlers are invoked, DocumentState=DocumentSaved; document close events can also be hooked and DocumentState=NoDocument can be updated; and any event such as moving the window from the title bar, maximizing/minimizing, etc., that does not alter the document are ignored. The DocumentState indicator is continuously updated as any change in the state is detected using the event handlers and hooks. Along with it, DocumentStateTime is recorded as the value of the time when this state was updated. DocumentState and DocumentStateTime can be updated by the data state monitoring service 28 for this specific application within the session for the user.

Forecasting whether the application will be active or inactive may be done by processing the current activity data and the application activity status indicator history of the application for the user, e.g., using one or more machine learning models. One illustrative method forecasts an application status by using the training samples in the same timeslot over a number of days (e.g., 16 days). The application status is tagged by activity metrics against the threshold values when the activity monitor service takes samples at a timeslot. Otherwise, the application status is inactive when application is off. For example, in a Word application, the 16 daily training samples are used to forecast an application status for a next day. Algorithms may assume all samples have an equal weight to calculate the percentage of active samples, which are then compared to a threshold. For instance, a majority decision algorithm forecasts application status as 'Inactive' because of 6 active samples among 16 training samples. In an alternative approach, algorithms apply different weights to samples over time, e.g., more recent samples have more vote weight than others. For instance, an exponential moving average is a first-order infinite impulse response filter that applies weighting factors which decrease exponentially. The weight for each older datum decreases exponentially, never reaching zero. Thus, an exponential moving average algorithm forecasts application status as 'Active' because of the recent samples with active status.

Figure 11:
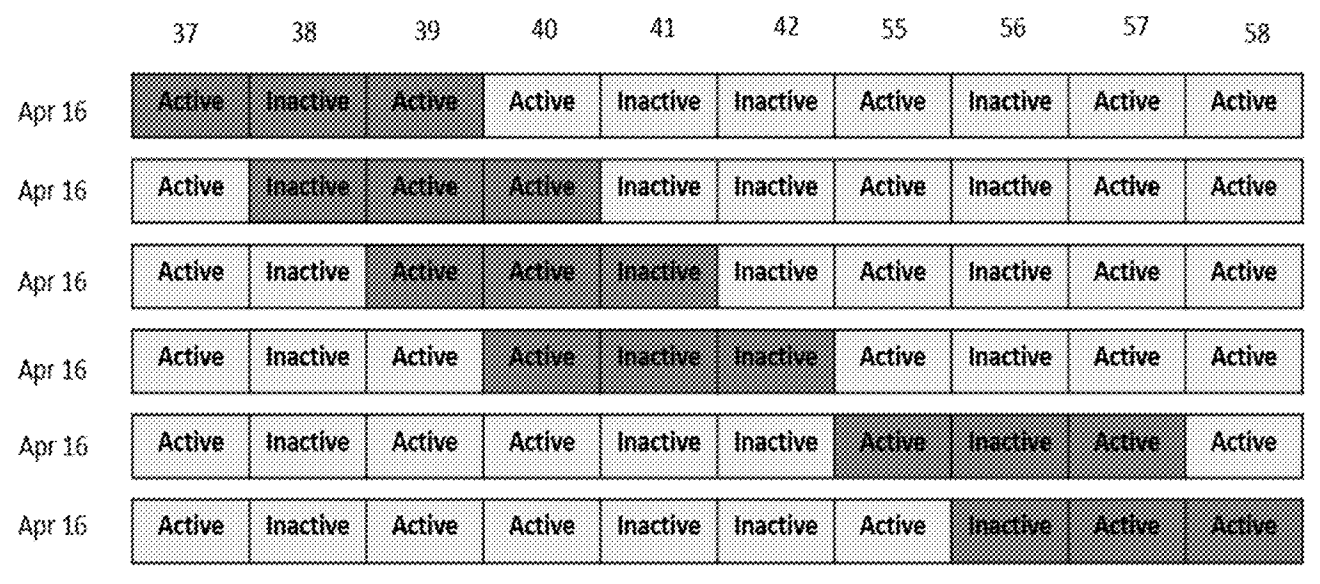

In another approach, forecasting is determined based on a probability of N consecutive statuses as shown in FIG. 11. This method first builds a tuple consisting of an application status in the recent N timeslots. Examining a few training samples from the same day (e.g., April 16) as shown demonstrates generally how the process works. (In a more robust approach, these tuples would be built from all the data points collected over several days and from several user sessions.) Taking a value of N=3, the method uses a sliding window with size 3 and moves forward to go through all 10 training samples on April 16. It requires all items in a sliding window come from consecutive timeslots. Accordingly, it skips a sliding window from timeslot 43 # to 54 #. The window size can be tuned by parameter N. As part of this step, the process identified are the following tuples:

Active,Inactive,Active
Active,Inactive,Inactive
Inactive,Active,Active
Active,Active,Inactive Then, for each tuple, calculate the total counts or frequencies
Active, Inactive, Active: 2

Active, Inactive, Inactive: 1
Inactive, Active, Active: 2
Active, Active, Inactive: 1

Figure 12:
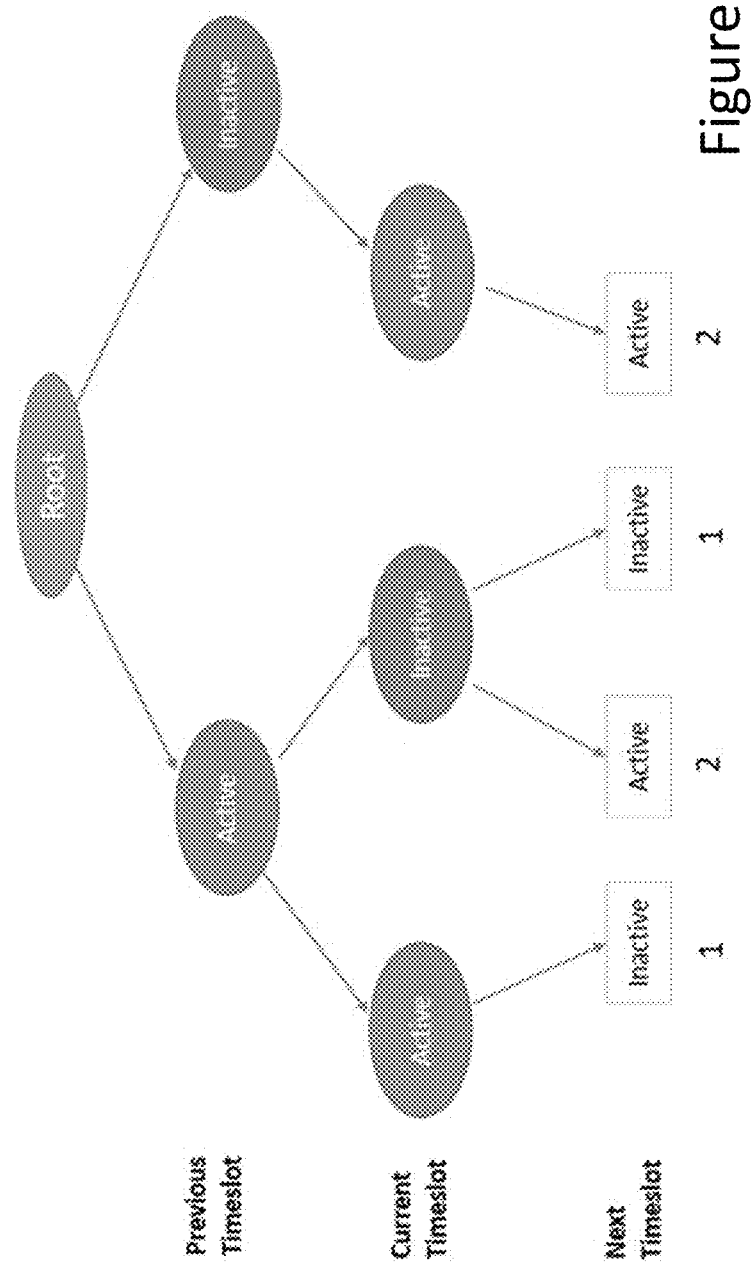
FIG. 12 depicts an active/inactive root diagram for an application, in accordance with an illustrative embodiment.

Then, construct decision trees as shown in FIG. 12 to provide a probability calculation. For instance, when the last status is 'Active', and the current status is 'Inactive', there exist the below two tuple patterns:

Active,Inactive,Active: 2
Active,Inactive,Inactive: 1

The probability of the next status value being 'Active' status is ⅔, while that of 'Inactive' is ⅓. Thus, in this case, the algorithm will forecast the next status as 'Active' as that has higher probability.

In still a further example of forecasting, a multivariate multi-step time series forecasting method can be utilized. In this case, the process predicts whether the application activity will be active or inactive over the next N timeslots. There are various commonly known strategies for making multi-step time series forecasts. In a direct multi-step forecast strategy, a separate model is built for each timeslot forecast. In the case of predicting the activity status for the next two timeslots, a model is developed for predicting the activity status, e.g., in timeslot 1 and a separate model for predicting for timeslot 2. In a recursive multi-step forecast, a one-step model is applied multiple times where the prediction for the prior time step is used as an input for making a prediction on the following time step. In the case of predicting the activity status for the next two timeslots, a one-step forecasting model is provided that predicts timeslot 1, which is then used as an observation input in order to predict timeslot 2. In a direct recursive hybrid strategy, both the above methods are combined. For example, a separate model can be constructed for each time step to be predicted, but each model may use the predictions made by models at prior time steps as input values. In a multiple output strategy approach, one model is utilized that is capable of predicting the entire forecast sequence in a one-shot manner. Multiple output models are more complex as they can learn the dependence structure between inputs and outputs as well as between outputs.

Historical data 34 (FIG. 1) as described herein can be used as input data for a ML forecasting process, e.g., based on a specific user, a group of users, or a group of applications. Data may be collected based on various strategies such as N samples or N days and once done, the data is processed for a ML pipeline. Once a ML model is trained for a user it can be used on the client device 12, or at the platform 10. For the former case, a model can be sent to the client device 12 when a user connects and input from the client device 12 can be fed into the model to receive a forecasted activity status vector output for N timeslots. For later case, input is sent to the application termination system 20 that does the inference and returns the result to the client device 12.

Once it is determined that an application is going to be inactive and the document state is DocumentSaved or NoDocument, then it is safe to take application termination actions. Policies may be utilized to determine whether the application should be terminated or not, e.g., based on the saved state, documents opened, etc. Policies can also consider a role of the user, a type of application, or a location of the client device 12. For example, the policy could be to not to close applications for a Vice President and above. Other criteria may include a location of where the application is running, e.g., an application running on premises might be less costly than an application running in a cloud, so the termination thresholds might be different. Still further criteria might include a level of security associated with running the application. For example, an application running on a server with the latest security patches might have a more lenient termination threshold than one running on a less secure server. As the date and time when the document was saved/opened within the session is saved, this information can also help the application termination system 20 to prefer applications to be terminated that have had long periods without activity since opening/save.

Within a session, when a termination decision is made, an application process is terminated along with its children. Application termination system 20 may also send a command via a brokering protocol to terminate the application. In another implementation, CITRIX ANALYTICS SERVICES may send a message command to the virtual delivery agent (VDA) to terminate the application. If the application is the only application within a session, then a further action may include logging off the session. The system 20 can logoff the session by sending a command to the VDA running inside the session. In an alternate implementation the system 20 can send message to kernel component to terminate the process.

Figure 13:
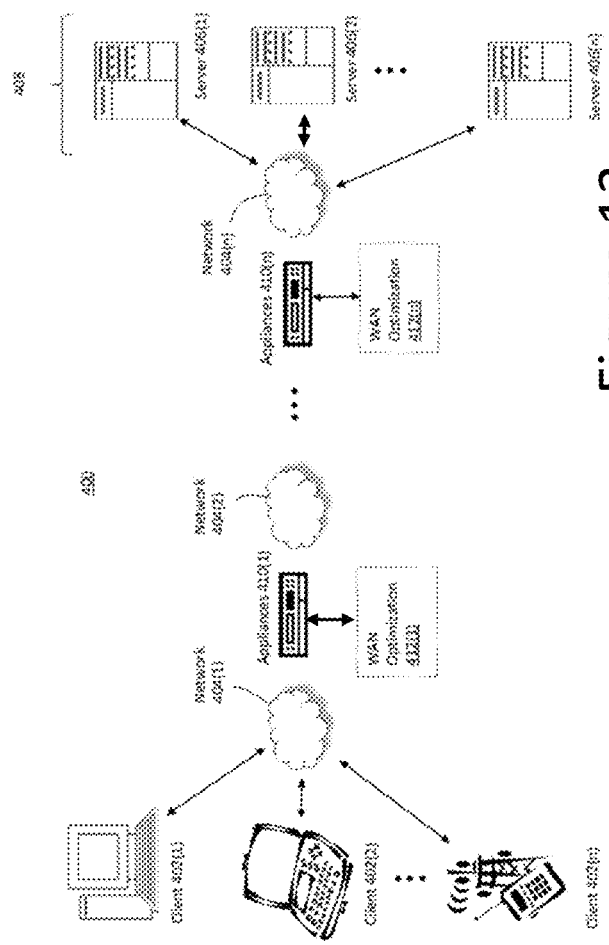
FIG. 13 depicts a network infrastructure, in accordance with an illustrative embodiment.

Referring to FIG. 13, an illustrative network environment 400 is depicted suitable for implementing an enterprise email platform. Network environment 400 may include one or more clients 402(1)-402(n) (also generally referred to as local machine(s) 402 or client(s) 402) in communication with one or more servers 406(1)-406(n) (also generally referred to as remote machine(s) 406 or server(s) 406) via one or more networks 404(1)-404n (generally referred to as network(s) 404). In some embodiments, a client 402 may communicate with a server 406 via one or more appliances 410(1)-410n (generally referred to as appliance(s) 410 or gateway(s) 410).

Although the embodiment shown in FIG. 13 shows one or more networks 404 between clients 402 and servers 406, in other embodiments, clients 402 and servers 406 may be on the same network 404. The various networks 404 may be the same type of network or different types of networks. For example, in some embodiments, network 404(1) may be a private network such as a local area network (LAN) or a company Intranet, while network 404(2) and/or network 404(n) may be a public network, such as a wide area network (WAN) or the Internet. In other embodiments, both network 404(1) and network 404(n) may be private networks. Networks 404 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 13, one or more appliances 410 may be located at various points or in various communication paths of network environment 400. For example, appliance 410(1) may be deployed between two networks 404(1) and 404(2), and appliances 410 may communicate with one another to work in conjunction to, for example, accelerate network traffic between clients 402 and servers 406. In other embodiments, the appliance 410 may be located on a network 404. For example, appliance 410 may be implemented as part of one of clients 402 and/or servers 406. In an embodiment, appliance 410 may be implemented as a network device such as Citrix CITRIX networking (formerly NetScaler®) products sold by CITRIX SYSTEMS, INC. of Fort Lauderdale, Fla.

As shown in FIG. 13, one or more servers 406 may operate as a server farm 408. Servers 406 of server farm 408 may be logically grouped, and may either be geographically co-located (e.g., on premises) or geographically dispersed (e.g., cloud based) from clients 402 and/or other servers 406. In an embodiment, server farm 408 executes one or more applications on behalf of one or more of clients 402 (e.g., as an application server), although other uses are possible, such as a file server, gateway server, proxy server, or other similar server uses. Clients 402 may seek access to hosted applications on servers 406.

As shown in FIG. 13, in some embodiments, appliances 410 may include, be replaced by, or be in communication with, one or more additional appliances, such as WAN optimization appliances 412(1)-412(n), referred to generally as WAN optimization appliance(s) 412. For example, WAN optimization appliance 412 may accelerate, cache, compress or otherwise optimize or improve performance, operation, flow control, or quality of feature of network traffic, such as traffic to and/or from a WAN connection, such as optimizing Wide Area File Features (WAFS), accelerating Server Message Block (SMB) or Common Internet File System (CIFS). In some embodiments, appliance(s) 412 may be a performance enhancing proxy or a WAN optimization controller. In one embodiment, appliance 412 may be implemented as CITRIX SD-WAN products sold by CITRIX SYSTEMS, INC. of Fort Lauderdale, Fla.

In described embodiments, clients 402, servers 406, and appliances 410 and 412 may be deployed as and/or executed on any type and form of computing device, such as any desktop computer, laptop computer, or mobile device capable of communication over at least one network and performing the operations described herein. For example, clients 402, servers 406 and/or appliances 410 and 412 may each correspond to one computer, a plurality of computers, or a network of distributed computers such as computing device 300 shown in FIG. 15.

Figure 14:
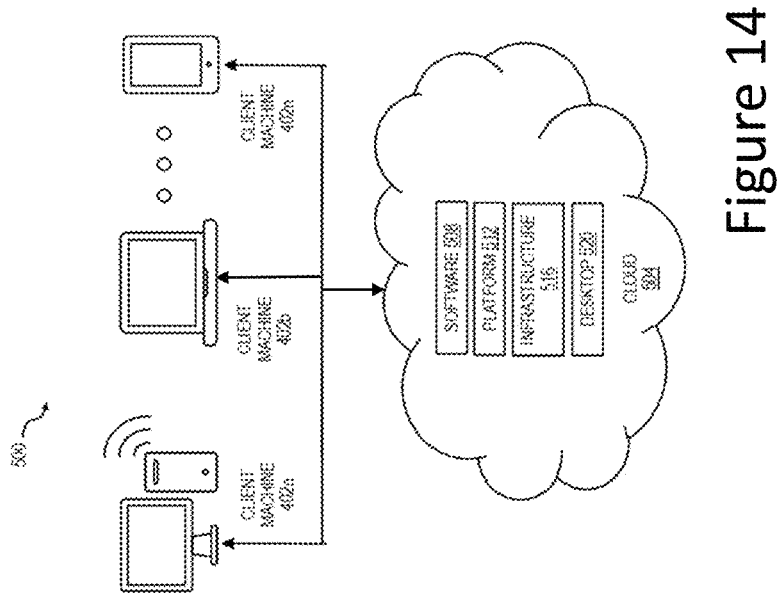
FIG. 14 depicts a cloud computing diagram, in accordance with an illustrative embodiment.

Referring to FIG. 14, a cloud computing environment 500 is depicted, which may also be referred to as a cloud environment, cloud computing or cloud network. The cloud computing environment 500 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 500, one or more clients 402a-402n (such as those described above) are in communication with a cloud network 504. The cloud network 504 may include back-end platforms, e.g., servers, storage, server farms or data centers. The users or clients 402a-402n can correspond to a single organization/tenant or multiple organizations/tenants. More particularly, in one example implementation the cloud computing environment 500 may provide a private cloud serving a single organization (e.g., enterprise cloud). In another example, the cloud computing environment 500 may provide a community or public cloud serving multiple organizations/tenants.

In some embodiments, a gateway appliance(s) or service may be utilized to provide access to cloud computing resources and virtual sessions. By way of example, CITRIX GATEWAY, provided by CITRIX SYSTEMS, INC., may be deployed on-premises or on public clouds to provide users with secure access and single sign-on to virtual, SaaS and web applications. Furthermore, to protect users from web threats, a gateway such as CITRIX SECURE WEB GATEWAY may be used. CITRIX SECURE WEB GATEWAY uses a cloud-based service and a local cache to check for URL reputation and category.

In still further embodiments, the cloud computing environment 500 may provide a hybrid cloud that is a combination of a public cloud and a private cloud. Public clouds may include public servers that are maintained by third parties to the clients 402a-402n or the enterprise/tenant. The servers may be located off-site in remote geographical locations or otherwise.

The cloud computing environment 500 can provide resource pooling to serve multiple users via clients 402a-402n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 500 can provide on-demand self-service to unilaterally provision computing capabilities (e.g., server time, network storage) across a network for multiple clients 402a-402n. By way of example, provisioning services may be provided through a system such as CITRIX PROVISIONING SERVICES (Citrix PVS). CITRIX PVS is a software-streaming technology that delivers patches, updates, and other configuration information to multiple virtual desktop endpoints through a shared desktop image. The cloud computing environment 500 can provide an elasticity to dynamically scale out or scale in response to different demands from one or more clients 402. In some embodiments, the cloud computing environment 500 can include or provide monitoring services to monitor, control and/or generate reports corresponding to the provided shared services and resources.

In some embodiments, the cloud computing environment 500 may provide cloud-based delivery of different types of cloud computing services, such as Software as a service (SaaS) 508, Platform as a Service (PaaS) 512, Infrastructure as a Service (IaaS) 516, and Desktop as a Service (DaaS) 520, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by AMAZON.COM, Inc., of Seattle, Wash., RACKSPACE CLOUD provided by RACKSPACE US, Inc., of San Antonio, Tex., GOOGLE COMPUTE ENGINE provided by GOOGLE Inc. of Mountain View, Calif., or RIGHTSCALE provided by RIGHTSCALE, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by MICROSOFT Corporation of Redmond, Wash., GOOGLE APP ENGINE provided by GOOGLE Google Inc., and HEROKU provided by HEROKU, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by GOOGLE Inc., SALESFORCE provided by SALESFORCE.COM Inc. of San Francisco, Calif., or OFFICE 365 provided by MICROSOFT Corporation. Examples of SaaS may also include data storage providers, e.g. CITRIX SHAREFILE from CITRIX SYSTESMS, DROPBOX provided by DROPBOX, Inc. of San Francisco, Calif., MICROSOFT SKYDRIVE provided by MICROSOFT Corporation, GOOGLE DRIVE provided by GOOGLE Inc., or APPLE ICLOUD provided by APPLE Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. CITRIX CLOUD from CITRIX SYSTEMS is one example of a DaaS delivery platform. DaaS delivery platforms may be hosted on a public cloud computing infrastructure such as AZURE CLOUD from MICROSOFT Corporation of Redmond, Wash. (herein "Azure"), or AMAZON WEB SERVICES provided by AMAZON.COM, Inc., of Seattle, Wash. (herein "AWS"), for example. In the case of CITRIX CLOUD, CITRIX WORKSPACE APP may be used as a single-entry point for bringing apps, files and desktops together (whether on-premises or in the cloud) to deliver a unified experience.

Elements of the described solution may be embodied in a computing system, such as that shown in FIG. 15 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 15 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, comprising:
monitoring activity data points for an application launched by a client device, wherein the activity data points include user interactions with a physical interface component;
monitoring state data for each file associated with the application;
in response to a determination that the application is inactive during a current time period based on the activity data points, determining if at least one file associated with the application includes unsaved content based on the state data;
in response to determining that no files for the application include unsaved content, forecasting whether the application will be inactive for a future time period based on the activity data; and
in response to determining that no files for the application include unsaved content and the application is forecast to be inactive for the future time period, terminating the application.

2. The method of claim 1, wherein the physical interface component includes at least one of: a keyboard, a mouse, a touchpad, a voice detection system, a gesture detector, or an image capture system.

3. The method of claim 1, wherein the state data for each file indicates whether the file was saved based on a detection of at least one of: a click, tap or touch on a save command, a save keyboard shortcut, an interaction with a file dialog, or an auto-save.

4. The method of claim 1, wherein the activity data points for the application launched by the client device further include background interactions occurring with the application.

5. The method of claim 4, wherein the background interactions include interactions occurring between the application and at least one of: a network communication, a file input/output, a peripheral device access, a registry access, or a disk access.

6. The method of claim 5, wherein the determination that the application is inactive during the current time period includes utilizing a machine learning model to determine whether the background interactions detected during the current time period indicate an active or inactive state.

7. The method of claim 1, further comprising logging off the client device if no other active applications exist have been launched by the client device.

8. The method of claim 1, wherein forecasting the application as inactive for the further time period includes:
obtaining a historical activity record for the application; and
applying a forecasting procedure on the historical activity record to determine a probability that the future time period will be inactive.

9. The method of claim 8, wherein the forecasting procedure includes a machine learning model that is trained for at least one of: a specific user, a group of users, or a group of applications.

10. The method of claim 1, wherein the step of terminating the application is further based on a criteria that includes at least one of: a role of the user, a type of application, a location of the client device, a location of where the application is running, and a level of security associated with running the application.

11. The method of claim 1, wherein the state data includes:
a first indicator indicating whether the file is open;
a second indicator indicating whether the file, if open, has been saved; and
a time indicator indicating when the state data of the file was last updated.

12. A system, comprising:
a processor; and
a non-volatile memory storing computer program code that when executed on the processor causes the processor to execute a process comprising:
monitoring activity data points for an application launched by a client device, wherein the activity data points include user interactions with a physical interface component;
monitoring state data for each file associated with the application;
in response to a determination that the application is inactive during a current time period based on the activity data points, determining if at least one file associated with the application includes unsaved content based on the state data;
in response to determining that no files for the application include unsaved content, forecasting whether the application will be inactive for a future time period based on the activity data; and
in response to determining that no files for the application include unsaved content and the application is forecast to be inactive for the future time period, terminating the application.

13. The system of claim 12, wherein the physical interface component includes at least one of: a keyboard, a mouse, a touchpad, a voice detection system, a gesture detector, or an image capture system.

14. The system of claim 12, wherein the state data for each file indicates whether the file was saved based on a detection of at least one of: a click, tap or touch on a save command, a save keyboard shortcut, an interaction with a file dialog, or an auto-save.

15. The system of claim 12, wherein the activity data points for the application launched by the client device further include background interactions occurring with the application.

16. The system of claim 15, wherein the background interactions include interactions occurring between the application and at least one of: a network communication, a file input/output, a peripheral device access, a registry access, or a disk access.

17. The system of claim 15, wherein the determination that the application is inactive during the current time period includes utilizing a machine learning model to determine whether the background interactions detected during the current time period indicate an active or inactive state.

18. The system of claim 12, wherein forecasting the application as inactive for the further time period includes:
   obtaining a historical activity record for the application; and
   applying a forecasting procedure on the historical activity record to determine a probability that the future time period will be inactive.

19. The system of claim 12, wherein the state data includes:
   a first indicator indicating whether the file is open;
   a second indicator indicating whether the file, if open, has been saved; and
   a time indicator indicating when the state data of the file was last updated.

\* \* \* \* \*